(12) United States Patent
Qiu et al.

(10) Patent No.: US 9,164,870 B2
(45) Date of Patent: *Oct. 20, 2015

(54) INTEGRATED FUZZING

(71) Applicant: Microsoft Corporation, Redmond, WA (US)

(72) Inventors: Jiong Qiu, Sammamish, WA (US); Michael Allan Friedman, Bellevue, WA (US); Charles Patrick Mann, Seattle, WA (US); Kwan-Leung Chan, Seattle, WA (US); Jeremy Lynn Reed, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,873

(22) Filed: Oct. 13, 2014

(65) Prior Publication Data

US 2015/0033079 A1    Jan. 29, 2015

Related U.S. Application Data

(63) Continuation of application No. 13/372,890, filed on Feb. 14, 2012, now Pat. No. 8,862,940.

(51) Int. Cl.
*G06F 11/00* (2006.01)
*G06F 11/36* (2006.01)
*G06F 11/263* (2006.01)

(52) U.S. Cl.
CPC .......... *G06F 11/3608* (2013.01); *G06F 11/263* (2013.01); *G06F 11/368* (2013.01); *G06F 11/3688* (2013.01)

(58) Field of Classification Search
CPC . G06F 11/368; G06F 11/3688; G06F 11/263; G06F 9/4443
See application file for complete search history.

(56) References Cited

U.S. PATENT DOCUMENTS 7,743,281 B2    6/2010    Conger et al.
8,136,095 B2    3/2012    Natanov et al.
(Continued)

OTHER PUBLICATIONS

"Cross_Fuzz—A Cross-Document DOM Binding Fuzzer", retrieved from <http://www.darknet.org.uk/2011/01/cross_fuzz-a-cross-document-dom-binding-fuzzer/> on Nov. 29, 2011, Jan. 5, 2011, 6 pages.
(Continued)

*Primary Examiner* — Charles Ehne
(74) *Attorney, Agent, or Firm* — John Jardine; Kate Drakos; Micky Minhas

(57) ABSTRACT

Integrated fuzzing techniques are described. A fuzzing system may employ a container configured as a separate component that can host different target pages to implement fuzzing for an application. A hosted target file is loaded as a subcomponent of the container and parsed to recognize functionality of the application invoked by the file. In at least some embodiments, this involves building a document object model (DOM) for a browser page and determining DOM interfaces of a browser to call based on the page DOM. The container then operates to systematically invoke the recognized functionality to cause and detect failures. Additionally, the container may operate to perform iterative fuzzing with multiple test files in an automation mode. Log files may be created to describe the testing and enable both self-contained replaying of failures and coverage analysis for multiple test runs.

20 Claims, 6 Drawing Sheets

(56) References Cited

U.S. PATENT DOCUMENTS

| | | | |
|---|---|---|---|
| 8,286,133 B2 | 10/2012 | Natanov et al. | |
| 8,417,993 B2 | 4/2013 | O'Leary | |
| 8,788,885 B1* | 7/2014 | Cook et al. | 714/38.1 |
| 8,862,940 B2 | 10/2014 | Qiu et al. | |
| 2004/0267485 A1 | 12/2004 | Penov et al. | |
| 2007/0050677 A1 | 3/2007 | Klamik | |
| 2007/0203973 A1 | 8/2007 | Landauer et al. | |
| 2008/0301647 A1 | 12/2008 | Neystadt et al. | |
| 2010/0180256 A1 | 7/2010 | Gorthi et al. | |
| 2011/0055813 A1 | 3/2011 | Calendino et al. | |
| 2012/0204091 A1* | 8/2012 | Sullivan et al. | 715/234 |
| 2013/0212435 A1 | 8/2013 | Qiu | |

OTHER PUBLICATIONS

"International Search Report and Written Opinion", Application No. PCT/US2013/023960, May 15, 2013, 10 pages.

"Introduction—Peach Fuzzing Platform", retrieved from <http://peachfuzzer.com/Introduction> on Nov. 29, 2011, Feb. 17, 2011, 2 pages.

"Non-Final Office Action", U.S. Appl. No. 13/372,890, Feb. 19, 2014, 6 pages.

"Notice of Allowance", U.S. Appl. No. 13/372,890, Jun. 6, 2014, 4 pages.

"Testing for DOM-based Cross site scripting (OWASP-DV-003)", retrieved from <https://www.owasp.org/index.php/Testing_for_DOM-based_Cross_site_scripting_%28OWASP-DV-003%29> on Nov. 29, 2011, 4 pages.

"The DOM, Your Ally for Testing Web Applications", Macro Testing, Nov. 2009, pp. 21-23.

Griffin, "Create a Custom Test Interface Provider for Team System", MSDN Magazine—retrieved from <http://msdn.microsoft.com/en-us/magazine/cc163313.aspx> on Nov. 29, 2011, Nov. 2007, 6 pages.

Hammersland, et al., "Fuzz Testing of Web Applications", retrieved from <http://www.aqualab.cs.northwestern.edu/HotWeb08/papers/Hammersland-FTW.pdf> on Nov. 29, 2011, 6 pages.

Neystadt, "Automated Penetration Testing with White-Box Fuzzing", MSDN—retrieved from <http://msdn.microsoft.com/en-us/library/cc162782.aspx> on Nov. 29, 2011, retrieved from <http://msdn.microsoft.com/en-us/library/cc162782.aspx> on Nov. 29, 2011,Feb. 2008, 11 pages.

* cited by examiner

INTEGRATED FUZZING

RELATED APPLICATIONS

This application is a continuation of and claims priority under 35 U.S.C. §120 to U.S. patent application Ser. No. 13/372,890, filed on Feb. 12, 2012, titled "Integrated Fuzzing", the disclosures of which is incorporated by reference herein in its entirety.

BACKGROUND

Fuzzing refers to a testing technique that consists of presenting a software application with simulated inputs to facilitate detection of vulnerabilities and programming bugs by purposely trying to make the application fail. For example, target content files, pages, and/or documents for an application, such as a browser or other content rendering application, may be used to test functionality of the application. In the case of a browser, this may involve building a Document Object Model (DOM) of a target page and making calls to various DOM interfaces of the browser according to the page DOM.

Traditionally, fuzzing code/logic configured to handle testing is hardcoded directly with a target page (e.g., in a single file). This may make it time consuming and expensive to create and maintain a collection of target files suitable for testing an application and/or to customize fuzzing for different scenarios. Moreover, traditional fuzzing techniques are not typically focused upon comprehensive analysis of an application and therefore may be limited to testing a small subset of functionality for an application. As such, developers are unable to rely upon traditional fuzzing techniques to ensure that their applications are full tested.

SUMMARY

Integrated fuzzing techniques are described. In an implementation, a fuzzing system employs a container as a separate component that can host multiple different target files to implement fuzzing for an application. A hosted target file is loaded as a subcomponent of the container and parsed to recognize functionality of the application invoked by the file. In at least some embodiments, this may involve building a document object model (DOM) for a page loaded by a browser and determining DOM interfaces of the browser to call based on the DOM for the hosted page. The container then operates to systematically invoke the recognized functionality to detect failures. Additionally, the container may be operated to iteratively perform fuzzing with multiple target files in an automation mode. Log files may be created to describe the testing and enable both replaying of failures and coverage analysis for multiple test runs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditionally, fuzzing code configured to handle testing is hardcoded directly with a target page or file, which makes it time consuming and expensive to create and maintain a collection of target files. Moreover, traditional fuzzing techniques may be limited to testing a small subset of functionality for an application and therefore do not provide comprehensive analysis of an application.

Integrated fuzzing techniques are described. In an implementation, a fuzzing system employs a container as a separate component that can host multiple different target files to implement fuzzing for a corresponding application. A hosted file is loaded as a subcomponent of the container and parsed to recognize functionality of the application invoked by the file. By way of example, fuzzing for a content rendering application or browser may involve building a document object model (DOM) for a hosted page and determining DOM interfaces to call based on the DOM for the hosted page. The container then operates to systematically invoke the recognized functionality to detect failures. Additionally, the container may be operated to iteratively perform fuzzing with multiple target files in an automation mode. Log files may be created to describe the testing and enable both replaying of failures and coverage analysis for multiple test runs.

In the following discussion, an example operating environment is first described that is operable to employ integrated fuzzing techniques described herein. In the course of discussing the example operating environment, some implementation details regarding an example fuzzing system are also discussed. Example procedures involving the various techniques are then described, which may be employed in the example environment as well as in other environments. Accordingly, the example environment is not limited to performing the example procedures. Likewise, the example procedures are not limited to implementation in the example environment. Thereafter, an example system and components of the system suitable to implement integrated fuzzing techniques in accordance with one or more embodiments are described.

Example Operating Environment

Figure 1:
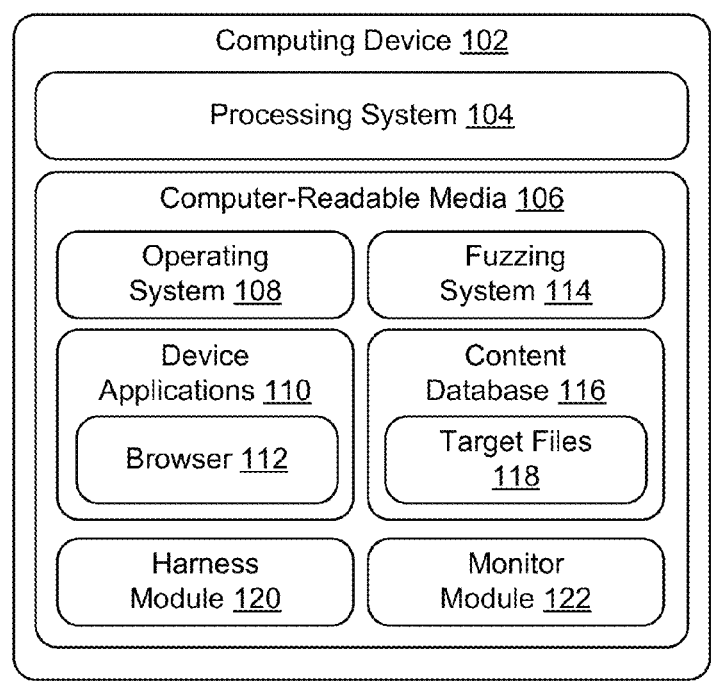
FIG. 1 is an illustration of an environment in an example implementation that is operable to employ integrated fuzzing techniques.

FIG. 1 is an illustration of an example operating environment 100 that is operable to employ integrated fuzzing techniques described herein. The operating environment includes a computing device 102 having a processing system 104 and computer-readable media 106 that is representative of various different types and combinations of media, memory, and storage components and/or devices that may be associated with a computing device. The computing device 102 is further illustrated as including an operating system 108 and one or more device applications 110 that may reside on the computer-readable media (as shown), may be implemented at least partially by one or more hardware elements, and/or may be executed via the processing system 104. A variety of device applications 110 to provide a wide range of functionality to the computing device 102 are contemplated including but not limited to a browser 112 as depicted in FIG. 1, a content rendering application, an office productivity application, an email client, a multi-media management program, networking applications, and so forth.

Figure 6:
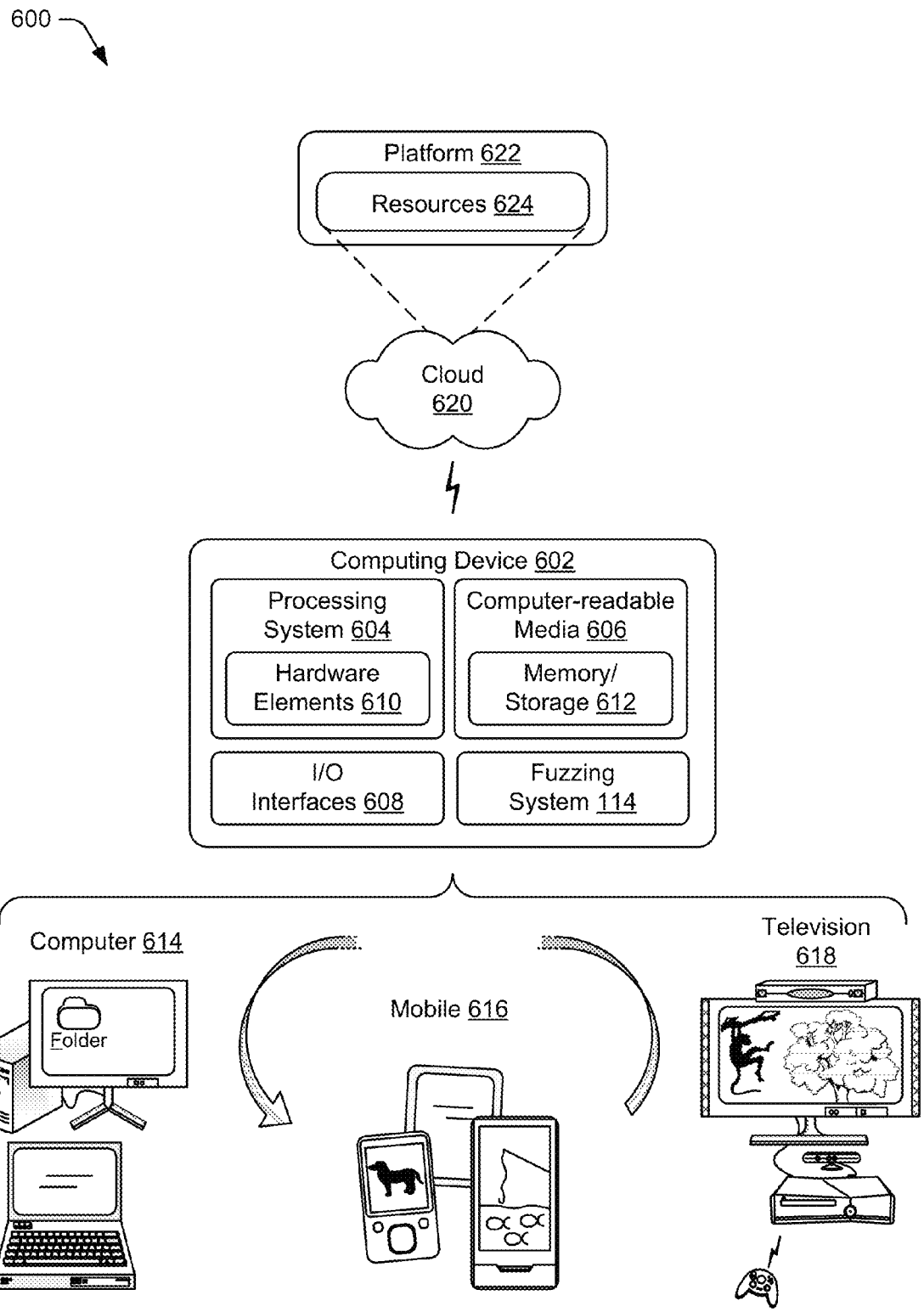
FIG. 6 illustrates an example system and components of the system that can be employed to implement embodiments of the techniques described herein.

Computer-readable media 106 may include both "computer-readable storage media" and "communication media," examples of which can be found in the discussion of the example computing system of FIG. 6. The computing device 102 may be configured as any suitable computing system and/or device that employ various processing systems 104 examples of which are also discussed in relation to the example computing system of FIG. 6.

The computing device 102 is also illustrated as including a fuzzing system 114 that represents various functionality and components operable to implement integrated fuzzing techniques described above and below. In general, the fuzzing system 114 is configured to test a subject application by simulating inputs to exercise a wide range of functionality provided by the subject application. For example, the fuzzing system 114 may access and utilize a content database 116 having various target files 118 configured to test functionality of a content rendering application, a browser 112, or other device application 110 configured to process the target files 118. More generally, the fuzzing system 114 enables testing of interfaces between content (e.g., documents, pages, application files, etc.) and applications that render, consume, or otherwise process the content.

In one particular example, the fuzzing system 114 is configured to test document object model (DOM) interfaces and related functionality of a browser using DOMs that are produced for various target pages. The DOM is a standard convention for representing and interacting with elements in pages for a browser (or other content rendering application). The DOM of a page can be built by a browser and used to reference, modify, apply effects, and otherwise manipulate elements on the page. Fuzzing of other interfaces, standards, models, conventions, and/or functionality associated with device applications 110 and corresponding content is also contemplated. Accordingly, it is to be appreciated that approaches involving DOM fuzzing described herein are provided as but one illustrative example. Comparable fuzzing techniques may be used for testing of interfaces for other standard or proprietary object models, content representation standards, and the like that may be associated with a browser 112 or other device applications 110.

As described in greater detail below, the fuzzing system 114 is configured to separate fuzzing logic, code, and/or functionality from target files/pages. Thus, the fuzzing system 114 may also use a collection of target files/pages to comprehensively test a subject application. Moreover, the fuzzing system 114 may create log files for test runs that enable reproduction of tests to replay failures for debugging. The replaying can occur in a self-contained manner using the log files and corresponding test files 118 without reliance upon the fuzzing system 114 to repeat the full test run. Additionally, the fuzzing system 114 may analyze the log files for multiple test runs to produce a coverage report that describes details regarding testing of the subject application.

To facilitate fuzzing of multiple target files 118, the computing device 102 may include a harness module 120 that represents functionality to implement an automation mode to iterate through a collection of target files and pass the target files into the fuzzing system 114 for fuzzing. A harness module 120 may be configured to launch a host application or module and iteratively load a collection of target files one at a time for testing an application. For instance, the harness module 120 may pass target file names from a folder, directory, or database into the host as parameters to cause successive testing with multiple files. The computing device 102 may also include a monitor module 122 that represents functionality to watch over the automated testing of multiple files to detect and handle failures, crashes, hang-ups and so forth. The monitor module 122 is configured to detect when the host has crashed/failed and can log various failure information in response to a failure. The logged information regarding a failure may include for example a reproduction link for the failure operable to replay the failure, a stack or memory dump, and an exploitability assessment. The monitor module 122 may also associate the log file with the target file and/or configure the reproduction link to designate the corresponding log file and target file. Although depicted separately, the harness module 120 and monitor module 122 may be combined and/or may be implemented as integrated components of the fuzzing system 114. Details regarding these and other aspects and components of a fuzzing system 114 are described in relation to the following figures.

Figure 2:
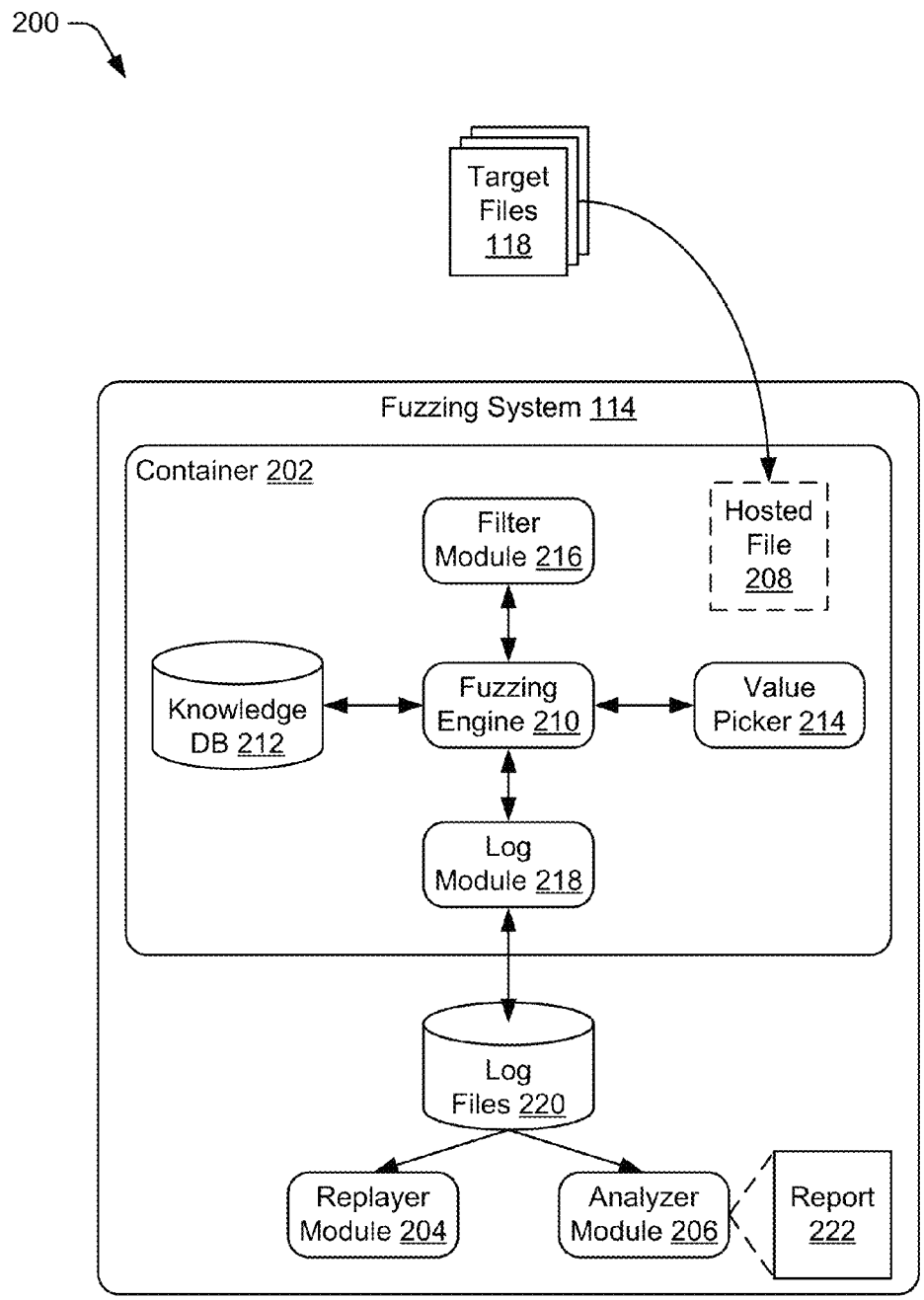
FIG. 2 illustrates an example fuzzing system of FIG. 1 in greater detail.

To further illustrate, consider now FIG. 2, which depicts generally at 200 an example of the fuzzing system 114 of FIG. 1 in greater detail. As mentioned, the fuzzing system 114 represents various functionality and components operable to implement integrated fuzzing techniques described herein. A suitable fuzzing system 114 may be configured in various ways to provide effective and systematic fuzzing for applications in an application development environment. In the example of FIG. 2, the fuzzing system 114 architecturally includes a container 202 component, a replayer module 204, and an analyzer module 206.

The container 202 represents core functionality of the fuzzing system 114 operable to conduct testing on a subject application. Generally speaking, the container may be configured as a content file, page, or document for the subject application that is designed to test various interfaces and functionality of the subject application. The container 202 may contain various components, code, markup, and/or script sufficient to implement fuzzing for a corresponding application. Accordingly, the container 202 may be a standalone file, page, or document (e.g., content) that corresponds to a particular application that the container 202 is designed to test.

For example, a container 202 designed for a browser 112 may be configured as a browser page having various elements and subcomponents to perform designated testing upon the browser. In this example, the container 202 may be a markup document that is written using hypertext markup language (HTML), extensible markup language (XML), extensible hypertext markup language (XHTML), scalable vector graphics (SVG), JavaScript, and/or other suitable code/script typically used to create content and pages understandable by the browser. Likewise, a target file 118 can be configured as a suitable browser page that can be loaded and parsed by the browser to form a markup. Target files 118 for a browser can include pages from a database of pre-existing test cases, original target pages established for particular test scenarios, and/or target pages extracted from live web pages. In this case, the container 202 may be configured as a DOM fuzzer to test DOM interfaces of the browser 112 as described above and below.

The container 202 also represents functionality to host target files 118 as subcomponents and thereby achieve separation of code/logic to implement fuzzing from the target files employed to test a subject application. Accordingly the container 202 is depicted in FIG. 2 as being configured to load a hosted file 208. For example, the container 202 may be configured to load a target page for browser fuzzing into an iframe or child window. The separation of testing code from the test files enables the fuzzing system 114 to operate upon an unlimited number of target files without changing the configuration of the fuzzing system 114. As different target files may provide different starting points for the interfaces, objects, properties, and methods that are subjected to fuzzing, the ability to operate on multiple target files enables the fuzzing system 114 to comprehensively cover different target configurations and corresponding application functionality thereby ensuring broad testing coverage.

In other words, the container 202 is a component that may implement a fuzzer to perform testing on a corresponding application using various target files 118. The container 202 incorporates various modules, files, and subcomponents that may be arranged in various ways to implement the fuzzer. By way of example, FIG. 2 depicts some example subcomponents including a fuzzing engine 210, knowledge database 212, value picker 214, filter module 216, and log module 218, which are discussed in turn below. The example subcomponents depicted in FIG. 2 represent respective functionality for fuzzing that is provided by the container 202. Naturally, functionality that is described in relation to various modules, components, and subcomponents herein may be combined or divided in many different suitable arrangements to implement integrated fuzzing techniques, of which the depicted arrangement is but one illustrative example.

The fuzzing engine 210 is configured to carry-out the fuzzing activity using respective target files 118. To do so, the fuzzing engine may operate to derive or otherwise obtain a file structure for the target file and/or analyze the file structure to identify various elements of the file that may correspond to particular functionality and/or interfaces of the application. Various elements associated with the file may include objects, properties, methods, functions, calls, and so forth that may be mapped to corresponding application functionality/interfaces. The file structure analysis enables the fuzzing engine 210 to recognize application functionality associated with the file and generate appropriate tests to carry out. In the case of a browser page, this may involve building and analyzing the DOM for the page and storing DOM objects into an object buffer. In addition, the fuzzing engine 210 may identify various DOM interfaces with which the page interacts based on objects in the DOM.

The fuzzing engine 210 is also configured to carry out tests using information obtained from analysis of the file structure as well as using input from the knowledge database 212, value picker 214, and the filter module 216. In operation, the fuzzing engine 210 performs a sequence of iterations to simulate inputs. Each iteration consists of testing application interfaces and/or functionality by performing tasks such as randomly getting a property value, setting a property to a random value, and/or calling a randomly selected method with random-valued parameters. The number and types of iterations may be based at least in part upon objects, methods, and properties identified through analysis of the file structure.

The knowledge database 212 is representative of a source of information regarding the interfaces and/or functionality of the subject application under test. The knowledge database 212 may provide descriptions of the interfaces and/or functionality as wells as descriptions of available tests and testing mechanisms. The knowledge database 212 is configured to supply the fuzzing engine 210 with testing rules and instructions for invoking various entry points into and/or functionality of the subject application. The fuzzing engine 210 uses this information to construct appropriate testing iterations. To do so, the fuzzing engine 210 may use file structure information for objects, properties, methods, functions, calls, etc. to reference corresponding testing rules and instructions from the knowledge database 212. In a DOM fuzzing implementation, the knowledge database 212 may include descriptors for the supported properties and methods of the DOM objects/interfaces. The knowledge database 212 may be configured to automatically acquires the descriptors by reading Interface Definition Language (IDL) files associated with the DOM for a browser.

The value picker 214 subcomponent is configured to understand data types of properties and parameters, including object references, and may derive and furnish corresponding values for a current context upon request of the fuzzing engine 210. In particular, the value picker 214 is configured to facilitate testing of an application by supplying valid values for specified properties and parameters to the fuzzing engine 210. The value picker 214 may rely upon the knowledge database 212 to determine appropriate data types and value ranges for different properties and parameters. By generating valid values for the current context, the value picker 214 enables the fuzzing system to avoid crashes due to invalid data that might occur frequently if strictly random values were employed for fuzzing. Thus, fuzzing that makes use of the value picker 214 is able to exercise various code paths at greater depths than would otherwise be possible.

The filter module 216 represents functionality operable to define various customizations for the fuzzing. The filter module 216 may be employed to modify the standard fuzzing/testing behavior of the fuzzing engine 210 by providing custom logic, tests, test filters, parameter values and so forth. The fuzzing engine 210 may interact with the filter module 216 to determine whether custom logic is available for testing with a particular file, a group of target files, or a series of testing runs/iterations. When custom logic is available, the fuzzing engine 210 may obtain instructions defining custom logic supplied by the filter module 216 and operate under the direction of the filter module 216 to apply the custom logic to carry out testing in a specified manner. The filter module 216 enables testing of particular scenarios by suppressing, modifying, or augmenting standard fuzzing behaviors and actions. For example, the filter module 216 may be used to cause the fuzzing engine 210 to bypass bugs determined from prior testing runs in order to penetrate deeper into a code path. In addition, a subset of tests and/or functionality to test may be designated to focus testing on particular code paths, areas, or interfaces. The filter module 216 may also be used to define custom tests and test values that may not be provided by the knowledge database 212 and/or fuzzing engine 210. Thus, the filter module 216 enables input of custom logic to focus the fuzzing on particular areas and avoid other areas, design and test particular scenarios, bypass known bugs, and so forth.

The log module 218 represents functionality to create log files 220 that describe the testing performed by the fuzzing engine 210. The log files 220 are associated with corresponding target files 118 and may include links or other identifiers for the files. The log files 220 record operations that are actually performed with target files for each test iteration and are independent of the logic used by the fuzzing engine 210 to construct the various tests. Thus, the log files 220 may be considered self-contained records of the fuzzing operations that can be consumed by the replayer module 204 and analyzer module 206 as described herein. The log files 220 may be consumed without reliance on the components represented by the container 202. Once created, a log file 220 is independent of the fuzzing engine 210 and the filter module 216 in the sense that the log module 218 operates to log various operations as they occur irrespective of the particular logic used by the fuzzing engine 210 to generate and carry out the tests. Thus, while the log files 220 reflect tests performed based on standard logic of the fuzzing engine 210 and/or custom logic defined via the filter module 216, the log files 220 are configured to provide self-contained records of the applied test operations. However, custom logic applied by the fuzzing engine 210 may be recorded in the log files 220 to enable the replayer module 204 to reproduce corresponding customizations.

The replayer module 204 represents functionality of the fuzzing system 114 operable to provide reproductions of test runs performed upon a subject application. Step-by-step reproductions may be provided to facilitate analysis, identification, isolation, and debugging of failures encountered in testing runs. The replayer module 204 may be configured to enable self-contained reproductions that are independent of the fuzzing engine 210 and other functionality of the container 202 used to implement fuzzing. To do so, the replayer module 204 may consume log files 220 that are produced by the log module 218. In particular, the replayer module 204 may read a log file 220 to reapply a series of operations (iterations) to a corresponding target file 118 that were recorded in the log file 220 during fuzzing of the target file 118. The replayer module 204 is configured to step through the specified operations as previously performed by the fuzzing engine 210 and therefore the actions of the replayer module 204 are deterministic.

In one approach, a reproduction link may be produced in conjunction with a failure for inclusion in a crash report or bug report. The reproduction link is a selectable link that may be used to navigate to the replayer module 204 and run a corresponding reproduction. Thus, the reproduction link may be configured to designate a target file and a corresponding log file and may also include a Uniform Resource Locator (URL) or other suitable link/control operable to cause the replayer module 204 to run a reproduction using the designated files.

In some scenarios, a simplified or reduced reproduction may be sufficient to reproduce a failure. Accordingly, the replayer module 204 may include or otherwise make use of a reducer tool (not shown) that is designed to remove extraneous operations/iterations from a reproduction. The reducer tool enables customizations to bypass selected operation/iterations described in a log file. For example, code paths for known bugs may be skipped to track down another bug and/or selected operation/iterations which are known not to contribute to a particular failure issue may be bypassed. Reduction of reproductions in this manner can facilitate isolation of a failure and overall efficiency of analysis to debug/fix issues identified by fuzzing.

The analyzer module 206 represents functionality of the fuzzing system 114 operable to conduct analysis of fuzzing operations to generate various statistical information for testing of a subject application. This may include a coverage assessment that indicates the comprehensiveness of testing performed upon the subject application. In particular, the analyzer module 206 may parse log files 220 to enumerate information such as which interfaces/functionality have already been tested, which interfaces/functionality have not been covered by the testing, failures and/or frequency of failures that occurred in the testing for various interfaces/functionality, how many times each particular feature has been tested, and so forth. The analyzer module 206 may output a report 222 in any suitable format to provide the coverage assessment and/or other information regarding testing of the subject application.

The analyzer module 206 may assess the coverage relative to the information regarding available tests and interfaces contained in the knowledge database 212. By comparing the log files 220 to information in the knowledge database 212, the analyzer module 206 may determine the comprehensiveness of coverage and provide indications in the report 222 regarding areas for additional testing. The feedback in the report 222 provides information to gauge how much fuzzing is left to do for different interfaces/functionality and also serves as a mechanism that can be used to develop custom logic for the filter module 216 to direct additional fuzzing in designated areas that have been missed or tested incompletely in previous testing runs.

Having considered an example environment and details for an example fuzzing system, consider now some example procedures for integrated fuzzing in accordance with one or more embodiments.

Example Procedures

The following discussion describes integrated fuzzing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example operating environment of FIG. 1 and example system of FIG. 2.

Figure 3:
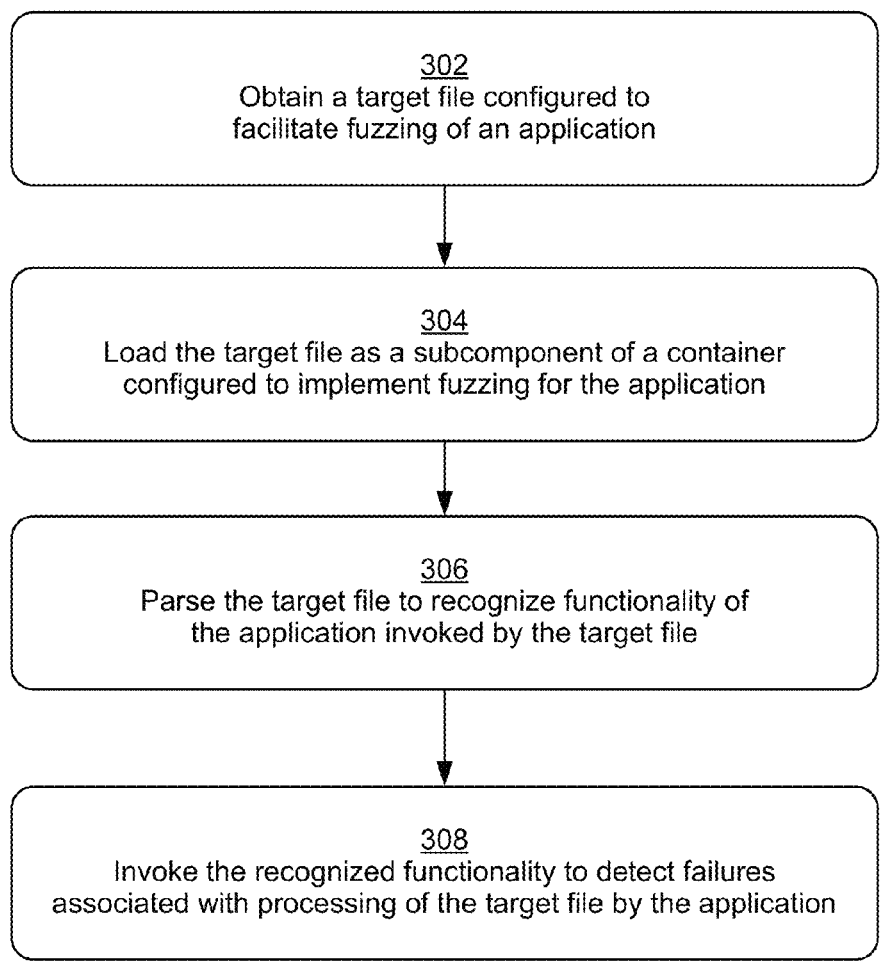
FIG. 3 is a flow diagram depicting a procedure in an example implementation in which a container performs fuzzing upon an application.

FIG. 3 depicts a procedure 300 in an example implementation in which a target file is employed to fuzz a corresponding application. A target file configured to facilitate fuzzing of an application is obtained (block 302). For example, target files 118 for testing of a corresponding application may be provided in a content database 116. A fuzzing system 114 may be configured to obtain a designated file for use in testing the application in any suitable way. For instance, in a user mode a user may provide input to designate a single target file to conduct the fuzzing. In an automation mode, a harness module 120 or equivalent functionality may be employed to provide target file names one after another as parameters to cause testing of the files in succession. For browser testing, the target files may be browser pages that are preconfigured as dedicated test pages and/or pages that are derived from live web pages specified by a developer.

The target file is loaded as subcomponent of a container configured to implement fuzzing for the application (block 304). For example, functionality to implement a fuzzer may be provided via a container 202 as previously described. The container 202 is employed to separate testing code/logic from the target files 118. Accordingly, target files 118 obtained in various ways described previously may be loaded as subcomponents of the container 202, as represented by hosted file 208 of FIG. 2. For instance, the container may be a browser page that can load target pages into an iframe or child-window associated with the browser page. In addition or alternatively, multiple iframes or child-windows may be employed to examine different pages and/or interfaces concurrently. In another approach, rather than providing a container 202 as described above and below, the fuzzing system 114 and in particular the fuzzing engine 210 may be implemented as a application add-on or stand-alone application designed to conducted fuzzing for target files 118 loaded by a corresponding application. Moreover, techniques for integrated fuzzing may be applied in the manner described herein to a variety of different applications and interfaces, an example of which is fuzzing of DOM interfaces for a browser described herein Thus, a variety of alternative configurations of the fuzzing system 114 are contemplated.

The target file is parsed to recognize functionality of the application invoked by the target file (block 306). For example, the container 202 may incorporate functionality, such as a fuzzing engine 210, to analyze a file structure of an input target file and identify various file elements such as objects, methods, properties, functions and so forth associated with the target file. Based on this analysis the fuzzing engine 210 or equivalent functionality is able to construct appropriate tests to apply to the identified file elements. This may involve interacting with a knowledge database 212 to obtain rules and instructions for the testing. Thus, fuzzing system 114 is able to generate a set of tests to perform upon a subject application based upon analysis of file structures for the target files. For browser fuzzing, this is accomplished by building and parsing DOMs for target pages to ascertain DOM objects, calls, and interfaces associated with the pages.

The recognized functionality is invoked to detect failures associated with processing of the target file by the application (block 308). For example, fuzzing engine 210 or equivalent functionality of the fuzzing system 114 may operate to systematically test an application based upon the test derived for a given target file. To do so, the fuzzing engine 210 may simulate a plurality of calls, set property and parameter values, and invoke methods corresponding to functionality that is recognized in conjunction with a target file. In some cases, a filter module 216 may be used to direct modifications of the standard testing logic of the fuzzing engine 210, as discussed previously.

Figure 4:
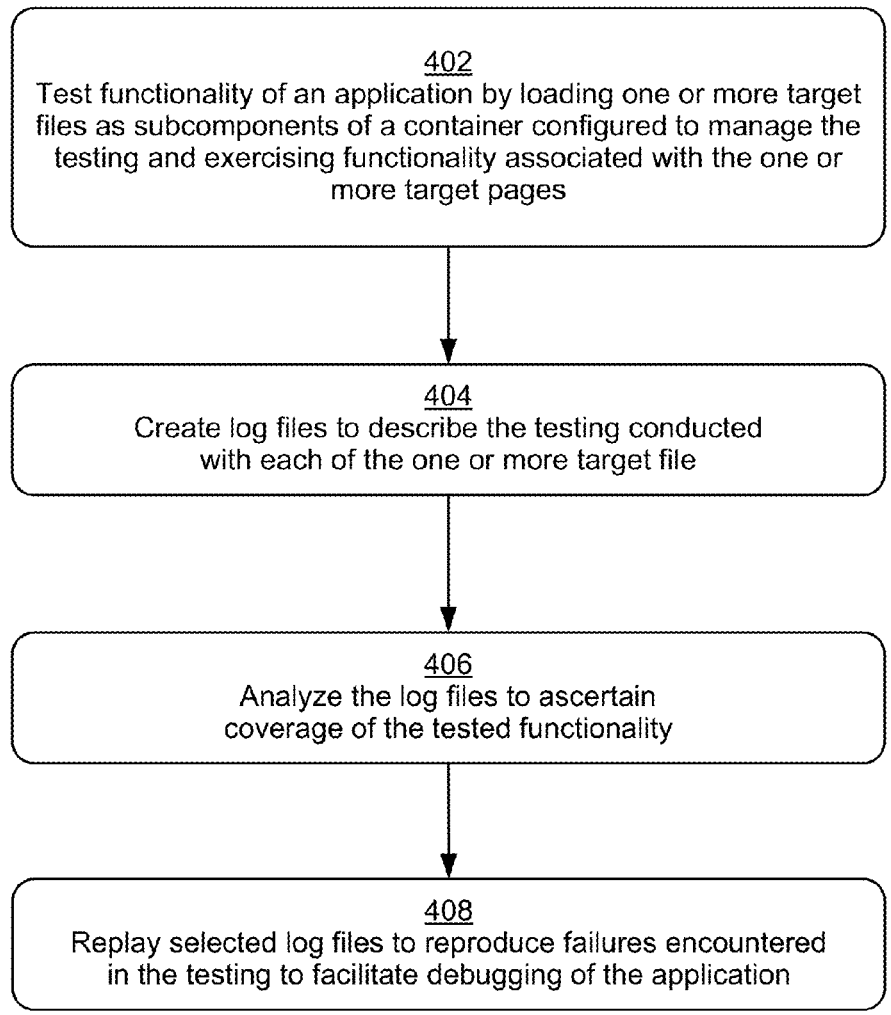
FIG. 4 is a flow diagram depicting a procedure in an example implementation in which log files are created for testing with one or more test pages and used for coverage analysis and replaying of selected tests to reproduce failures.

FIG. 4 depicts another procedure 400 in an example implementation in which log files are created and used to analyze fuzzing coverage and replay selected tests to reproduce failures. Functionality of an application is tested by loading one or more target files as subcomponents of a container configured to manage the testing and exercising functionality associated with the one or more target pages (block 402). For instance fuzzing of a browser 112, content rendering application or other device application 110 may occur in the manner previously described using a container 202 or other suitable fuzzing system 114 designed to systematically test functionality of an application.

Log files are created to describe the testing conducted with each of the one or more target files (block 404). For instance, log files 220 may be output by the fuzzing system 114 to describe testing operations/actions that are performed with corresponding target files 118. The log files 220 may be self-contained records related to the target files 118 that may be consumed without having to repeat testing runs by the fuzzing system 114. This provides standalone capabilities to analyze testing coverage and/or to replay testing runs to debug failures.

In particular, the log files are analyzed to ascertain coverage of the tested functionality (block 406). Here, an analyzer module 206 may be invoked to produce a report 222 as discussed in relation to FIG. 2. The report 222 may include a coverage assessment that indicates how completely various functionality and interfaces have been tested. Additionally, the coverage assessment may show areas in which little or no testing has been performed, which may prompt additional and/or focused testing on these areas.

Selected log files are replayed to reproduce failures encountered in the testing to facilitate debugging of the application (block 408). For instance, a replayer module 204 may be invoked to provide reproductions of testing defined by the log files 118 as discussed in relation to FIG. 2. Because the log files are self-contained, a reproduction may be generated by the replayer module 204 directly using a log file and a corresponding target file. The replayer module 204 does not rely upon other components of the fuzzing system 114 to create the reproductions. As such, the replayer module 204 provides reproductions that are deterministic, reducible to remove extraneous operations, and able to work independently of fuzzing logic and/or updates made to the fuzzing logic as the fuzzing system 114 evolves.

Figure 5:
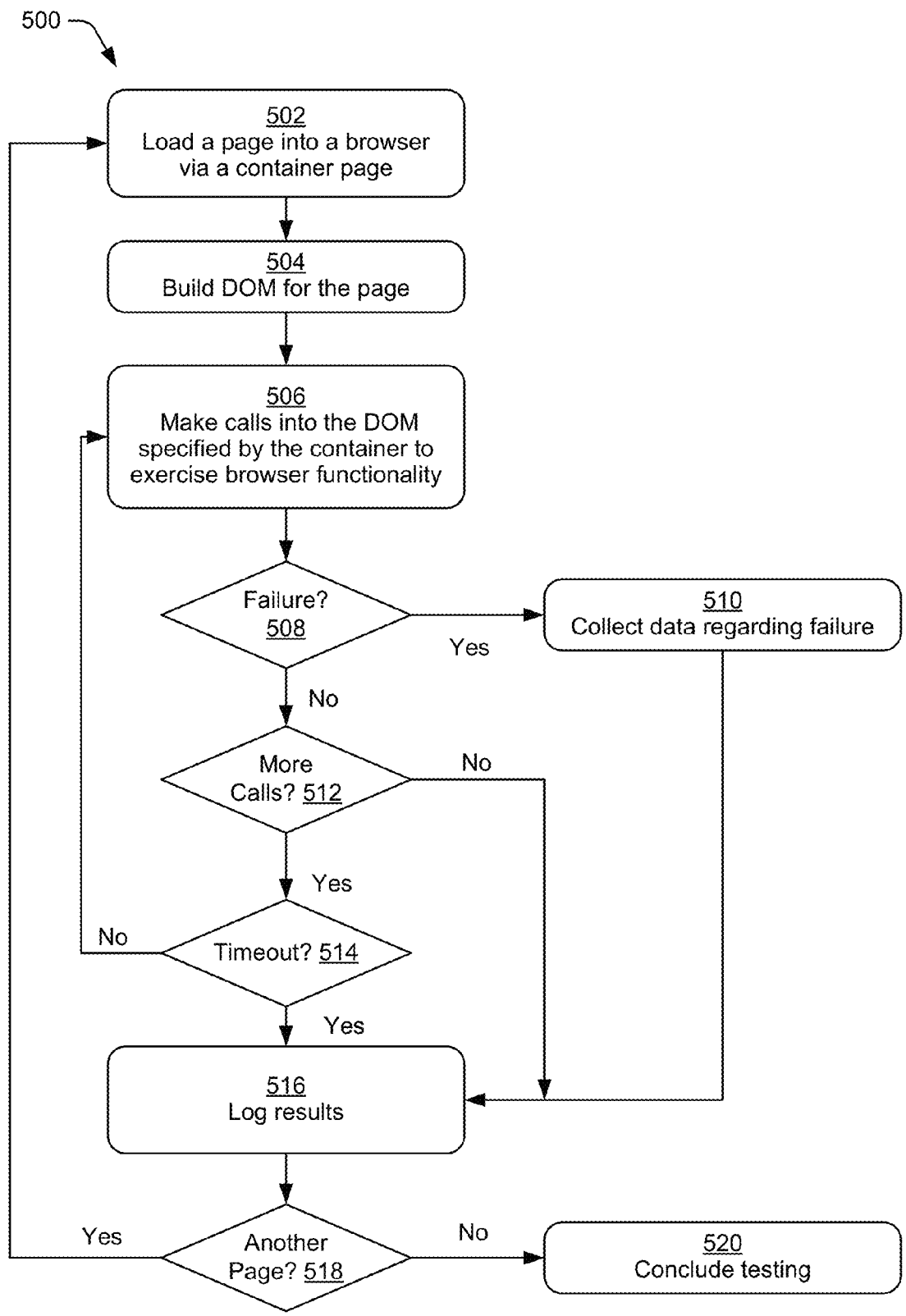
FIG. 5 is a flow diagram depicting a procedure in an example implementation in which an automation mode is employed to iterate through multiple test pages.

FIG. 5 depicts a procedure 500 in an example implementation in which an automation mode is employed to iterate through multiple test pages. In the example of FIG. 5, the fuzzing system 114 is configured as DOM fuzzer for testing DOM interfaces of a browser 112. Comparable techniques may be employed to perform automated fuzzing with other kinds of applications and corresponding interfaces.

As mentioned previously, a fuzzing system 114 may employ a harness module 120 to feed target files into the fuzzing system 114 and/or a monitor module 122 to keep track of the fuzzing for multiple files, detect failures that are encountered, and/or implement logging of information for any failures that are detected. In this case, the target files are pages designed to invoke various DOM interfaces of a browser 112.

In particular, an automated fuzzing run may be initialized by designating a folder, directory, or database of target file 118 over which the harness module 120 may iterate. In operation, the harness module 120 may launch the browser (e.g., host application), cause the browser to load a container 202 designed to manage the fuzzing operations, and pass file names into the container as parameters one-by-one for successive iterations as testing progresses. During the testing, the monitor module 122 may detect and handle any failures and log appropriate data for each iteration.

For each iteration of a testing run, a page is loaded into a browser via a container page (block 502). Here, a file specified by the harness module 120 may be loaded into a container 202 rendered by the browser. In this case, the container 202 is configured as a page that hosts the target page in an iframe or child-window.

A document object model (DOM) for the page is built (block 504). For instance, the container 202 is configured to load the page and parse the page to build a DOM for the page. The container 202 and in particular a fuzzing engine 210 provided as a component of the container may examine the DOM to produce an object pool having DOM objects that are specified in markup of the page. The fuzzing engine 210 may then determine a plurality of calls to make to exercise DOM interfaces of the browser based on the DOM objects ascertained from the markup. As mentioned, the particular calls and/or tests may be determined with reference to rules and instructions provided by the knowledge database 212.

Calls specified by the container are made into the DOM to exercise browser functionality (block 506). For example, the fuzzing engine 210 may cause calls to various DOM interfaces to set properties, invoke methods, get values, and so forth. The fuzzing engine 210 may systematically progress through testing of various DOM objects and interfaces using rules and instructions provided by the knowledge database 212 to make a plurality of calls. Custom logic from a filter module 216 may also be employed in some scenarios. Further, select property and parameter values for the calls may be provided via a value picker 214 to facilitate the testing. The fuzzing is designed to purposely cause failures so that developers can identify, debug, and correct the failures.

A determination is made regarding whether a failure occurred (block 508) and when a failure occurs, data regarding the failure may be collected (block 510). As long as a failure is not encountered, a determination is made regarding whether there are more calls to make (block 512). If there are more calls to make for the particular testing run, the testing may continue by making additional calls to test the DOM interfaces. Optionally, the harness module 120 may be configured to enforce a timeout to control testing times. Thus, as shown in FIG. 5, a determination may also be made regarding whether a timeout is reached (block 514). When a timeout does occur, the testing and/or browser session may be terminated and the harness module 120 may move on to the next target file/iteration. Naturally the different determinations just described may be made in different orders and at different times during the testing.

Assuming there are additional calls to make per block 512 and the timeout has not been reached per block 514, procedure 500 returns to block 506 where the additional calls for the testing run are made and various determinations regarding failures, additional calls, and timeouts may be repeated. On the other hand, when there are not additional calls to make per block 512 or when the timeout is reached per block 514, results of the testing are logged (516). Results may also be logged following collection of data when a failure occurs per block 510. For example, a log module 218 may be used to produce log files 220 as discussed previously. In the case of failures, the log module 218 may interact with the monitor module 122 to include reproduction links, stack and memory dumps, and other data related to the failure in the logs.

After logging results of testing using a particular page, a determination is made regarding whether there is another page to test (block 518). If so, the procedure 500 returns to block 502 and loads to next page for the next testing iteration and the testing process just described is repeated with the next page. The harness module 120 may handle passing in file names successively for each iteration as previously described. When there are no more pages to test at block 518, the testing is concluded (block 520).

Having considered some example procedures for integrated fuzzing techniques, consider now a discussion of an example system and components of the system that may be employed to implement aspects of the described techniques in one or more embodiments.

Example System

FIG. 6 illustrates an example system 600 that includes an example computing device 602 that is representative of one or more computing systems and/or devices that may implement the various techniques described herein. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including device applications 110, fuzzing system 114, harness module 120, monitor module 122, container 202, replayer module 204, analyzer module 206, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the fuzzing system 114 on the computing device 602. The functionality of the fuzzing system 114 and other modules may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device comprising:
a processing system; and
one or more modules operable via the processing system to implement a fuzzing system configured to perform operations to test a content rendering application including:
obtaining a target file configured to facilitate fuzzing of the content rendering application in which functionality of the application is tested by simulating inputs to cause failures of the application;
loading the target file as a subcomponent of a container configured to implement the fuzzing for the content rendering application;
building a content representation for elements of the target file to enumerate functionality of the application invoked by the target file; and
invoking the enumerated functionality to detect failures associated with processing of the target file by the application.

2. A computing device as described in claim 1, wherein the container is configured to separate logic for testing the functionality of the content rendering application from the target file.

3. A computing device as described in claim 1, wherein building the content representation comprises analyzing a file structure of the target file to identify elements that correspond to particular functionality of the content rendering application.

4. A computing device as described in claim 1, wherein the container is configured as a standalone component to load and conduct testing of the content rendering application with a plurality of target files separate from the container.

5. A computing device as described in claim 1, wherein invoking the enumerated functionality comprises testing one or more document object model (DOM) interfaces used to represent and interact with content for the content rendering application.

6. A computing device as described in claim 1, wherein the one or more modules are further operable via the processing system to perform operations comprising:
referencing a knowledge database based on the enumerated functionality to obtain rules and instructions used to invoke the enumerated functionality.

7. A computing device as described in claim 1, wherein the one or more modules are further operable via the processing system to perform operations comprising:
creating log files configured to describe testing operations performed to invoke the enumerated functionality.

8. A computing device as described in claim 1, wherein the one or more modules are further operable via the processing system to perform operations comprising:
obtaining instructions defining custom logic to modify standard testing behavior of the container and applying the custom logic when invoking the enumerated functionality.

9. A method to test functionality of an application comprising:
obtaining a target file configured to facilitate fuzzing of the application in which functionality of the application is tested by simulating inputs to cause failures of the application;
loading the target file as a subcomponent of a container configured to implement the fuzzing for the application;
building a content representation for elements of the target file to enumerate functionality of the application invoked by the target file; and
invoking the enumerated functionality to detect failures associated with processing of the target file by the application.

10. A method as described in claim 9, wherein the container is configured to separate logic for testing the functionality of the application from the target file.

11. A method as described in claim 9, wherein building the content representation comprises analyzing a file structure of the target file to identify elements that correspond to particular functionality of the application.

12. A method as described in claim 9, wherein the container is configured as a standalone component to load and conduct testing of the application with a plurality of target files separate from the container.

13. A method as described in claim 9, wherein the application comprises a content rendering application configured to process the target file.

14. A method as described in claim 9, wherein invoking the enumerated functionality comprises testing one or more document object model (DOM) interfaces used to represent and interact with content for the application.

15. A method as described in claim 9, further comprising referencing a knowledge database based on the enumerated functionality to obtain rules and instructions used to invoke the enumerated functionality.

16. A method as described in claim 9, further comprising creating log files configured to describe testing operations performed to invoke the enumerated functionality.

17. A method as described in claim 9, further comprising obtaining instructions defining custom logic to modify standard testing behavior of the container and applying the custom logic when invoking the enumerated functionality.

18. One or more computer-readable storage media storing instructions that, when executed by a processing system, implement a fuzzing engine configured to perform operations to test functionality of an application including:
obtaining a target file configured to facilitate fuzzing of the application in which functionality of the application is tested by simulating inputs to cause failures of the application;
loading the target file as a subcomponent of a container configured to implement the fuzzing for the application;

building a content representation for elements of the target file to enumerate functionality of the application invoked by the target file; and invoking the enumerated functionality to detect failures associated with processing of the target file by the application.

19. One or more computer-readable storage media as described in claim 18, wherein invoking the enumerated functionality comprises testing one or more document object model (DOM) interfaces used to represent and interact with content for the application.

20. One or more computer-readable storage media as described in claim 18, wherein invoking the enumerated functionality comprises testing one or more document object model (DOM) interfaces used to represent and interact with content for the application.

* * * * *